(12) United States Patent
Xie et al.

(10) Patent No.: US 12,320,417 B2
(45) Date of Patent: Jun. 3, 2025

(54) VEHICLE ELECTRIC DRIVE MODULE WITH THERMAL MANAGEMENT SYSTEM

(71) Applicants: Zhe Xie, Oakland Township, MI (US); Namrood Al-Mooshi, Commerce Township, MI (US)

(72) Inventors: Zhe Xie, Oakland Township, MI (US); Namrood Al-Mooshi, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 636 days.

(21) Appl. No.: 17/689,484

(22) Filed: Mar. 8, 2022

(65) Prior Publication Data

US 2023/0287975 A1    Sep. 14, 2023

(51) Int. Cl.
*F16H 57/04*    (2010.01)

(52) U.S. Cl.
CPC ..... *F16H 57/0445* (2013.01); *F16H 57/0412* (2013.01); *F16H 57/0421* (2013.01); *F16H 57/0436* (2013.01); *F16H 57/0476* (2013.01)

(58) Field of Classification Search
CPC ............ F16H 57/0412; F16H 57/0421; F16H 57/0436; F16H 57/0445; F16H 57/0476
USPC .............................................. 310/53, 54, 64
See application file for complete search history.

(56) References Cited

U.S. PATENT DOCUMENTS

| | | | |
|---|---|---|---|
| 8,403,088 B2 | 3/2013 | Knoblauch et al. | |
| 8,960,341 B2 | 2/2015 | Weber | |
| 9,783,035 B1 | 10/2017 | Huang et al. | |
| 10,207,751 B2 | 2/2019 | Milton et al. | |
| 10,272,767 B1 | 4/2019 | Yifan et al. | |
| 11,267,453 B1* | 3/2022 | Bolthouse | B60W 30/1882 |
| 11,274,595 B1* | 3/2022 | Farhat | F01P 5/02 |
| 11,402,017 B1* | 8/2022 | Hathaway | F16H 61/0031 |
| 11,541,719 B1* | 1/2023 | Richardson | B60H 1/004 |
| 11,745,580 B2* | 9/2023 | Lee | F01M 5/005 180/65.275 |
| 11,890,914 B2* | 2/2024 | Mazaira | B60L 58/27 |
| 2013/0119793 A1 | 5/2013 | Hofkirchner et al. | |
| 2018/0178615 A1 | 6/2018 | Xia et al. | |
| 2020/0158003 A1* | 5/2020 | Quix | F01P 3/02 |

(Continued)

FOREIGN PATENT DOCUMENTS

| | | |
|---|---|---|
| DE | 112020002018 T5 | 1/2022 |
| KR | 20180066416 A | 6/2018 |

OTHER PUBLICATIONS

International Search Report and Written Opinion dated Jun. 20, 2023 for International Application No. PCT/US2023/063575, International Filing Date Mar. 2, 2023.

*Primary Examiner* — Rashad H Johnson
(74) *Attorney, Agent, or Firm* — Jeremy J. Klobucar

(57) ABSTRACT

An electric drive module (EDM) configured to generate and transfer drive torque to a driveline for propulsion of an electric vehicle. The EDM includes a gearbox assembly, an electric motor having a rotor and a stator, and a thermal management system. The thermal management system includes a fluid circuit configured to supply a fluid to the gearbox assembly, the rotor, and the stator, and a pump configured to direct the fluid through the fluid circuit. A valve is disposed on the fluid circuit and configured to selectively move between (i) a closed position where the fluid is not supplied to the stator, and (ii) an open position where the fluid is supplied to the stator for cooling thereof.

18 Claims, 4 Drawing Sheets

(56) References Cited

U.S. PATENT DOCUMENTS

| | | | |
|---|---|---|---|
| 2020/0232557 A1* | 7/2020 | Xu | B60W 10/06 |
| 2020/0350648 A1* | 11/2020 | Rheaume | H01M 10/63 |
| 2021/0010766 A1* | 1/2021 | Dlala | F28F 27/02 |
| 2021/0088124 A1* | 3/2021 | Remboski | H02K 9/19 |
| 2021/0129660 A1 | 5/2021 | Bradfield | |
| 2021/0184294 A1* | 6/2021 | Mackenzie | B60L 58/26 |
| 2021/0370742 A1* | 12/2021 | Holihan | B60H 1/00735 |
| 2022/0024442 A1* | 1/2022 | Ball | B60W 20/50 |
| 2022/0042458 A1* | 2/2022 | Long | F02C 7/12 |
| 2022/0089013 A1* | 3/2022 | Suzuki | B60W 10/06 |
| 2022/0185120 A1* | 6/2022 | Liu | H02P 21/14 |
| 2022/0234420 A1* | 7/2022 | Hall | B60H 1/143 |
| 2022/0242582 A1* | 8/2022 | Rambo | F02C 7/224 |
| 2023/0071735 A1* | 3/2023 | Smith | F02C 3/04 |
| 2023/0093610 A1* | 3/2023 | Honjo | B60K 11/085 180/68.2 |
| 2023/0110432 A1* | 4/2023 | Laforce | F16H 57/029 310/54 |
| 2023/0228211 A1* | 7/2023 | Ichikawa | F01P 3/12 |
| 2023/0261536 A1* | 8/2023 | Vanhee | H02K 7/04 310/54 |
| 2023/0341043 A1* | 10/2023 | Garmel | F16H 57/0457 |
| 2023/0387753 A1* | 11/2023 | Oechslen | H02K 9/197 |
| 2023/0387835 A1* | 11/2023 | Malone | B60K 11/02 |
| 2024/0083217 A1* | 3/2024 | Girin | B60H 1/143 |
| 2024/0162521 A1* | 5/2024 | Seibert | H01M 10/6567 |
| 2024/0190212 A1* | 6/2024 | Mukai | B60H 1/00885 |
| 2024/0194978 A1* | 6/2024 | Yuan | H01M 10/659 |
| 2024/0227508 A1* | 7/2024 | Moczek | B60H 1/3228 |
| 2024/0271693 A1* | 8/2024 | Gassmann | F16H 57/045 |
| 2024/0322649 A1* | 9/2024 | Ganakota | H02K 9/193 |
| 2024/0333101 A1* | 10/2024 | Kniel | H02K 9/193 |
| 2024/0348126 A1* | 10/2024 | Samie | H05K 7/20845 |
| 2024/0348128 A1* | 10/2024 | Krank | H02K 9/19 |

* cited by examiner

VEHICLE ELECTRIC DRIVE MODULE WITH THERMAL MANAGEMENT SYSTEM

FIELD

The present application generally relates to battery electric vehicles (BEVs) and, more particularly, to thermal management systems for BEV electric drive modules.

BACKGROUND

Some battery electric vehicles (BEVs) include an electric drive module (EDM) for propulsion. Some EDMs are cooled by thermal systems to prevent overheating. However, such conventional thermal systems are constantly operating to provide a constant flow of coolant to the EDM, thereby potentially resulting in unnecessary power consumption. Accordingly, while such conventional thermal systems work well for their intended purpose, there exists an opportunity for improvement in the relevant art.

SUMMARY

According to one example aspect of the invention, an electric drive module (EDM) configured to generate and transfer drive torque to a driveline for propulsion of an electric vehicle is provided. In one exemplary implementation, the EDM includes a gearbox assembly, an electric motor having a rotor and a stator, and a thermal management system. The thermal management system includes a fluid circuit configured to supply a fluid to the gearbox assembly, the rotor, and the stator, and a pump configured to direct the fluid through the fluid circuit. A valve is disposed on the fluid circuit and configured to selectively move between (i) a closed position where the fluid is not supplied to the stator, and (ii) an open position where the fluid is supplied to the stator for cooling thereof.

In addition to the foregoing, the described EDM may include one or more of the following features: a controller programmed to operate the pump at a first flow rate to minimize power consumption when the valve is closed and stator cooling is not required, and operate the pump at a second flow rate higher than the first flow rate to facilitate providing cooling to the stator when the valve is open and stator cooling is required; wherein the controller is programmed to operate the pump at the second flow rate when a temperature of the stator exceeds a predetermined threshold; wherein the controller is programmed to operate the pump at the second flow rate when a load on the electric motor exceeds a predetermined threshold; wherein the controller is programmed to open the valve when a temperature of the stator exceeds a predetermined threshold; and wherein the controller is programmed to open the valve when a load on the electric motor exceeds a predetermined threshold.

In addition to the foregoing, the described EDM may include one or more of the following features: wherein the valve is a check valve configured to remain closed when the pump is operated at the first flow rate, and open when the pump is operated at the second flow rate; wherein the valve is a solenoid valve in signal communication with the controller, wherein the controller is configured to open the valve when the pump is operated at the second flow rate; and wherein the fluid circuit includes a first conduit configured to supply fluid to the gearbox assembly for lubrication thereof, a second conduit configured to supply fluid to the rotor for cooling thereof, and a third conduit configured to supply fluid to the stator for cooling thereof, wherein the valve is disposed on the third conduit.

In addition to the foregoing, the described EDM may include one or more of the following features: wherein the fluid circuit further includes a sump configured to receive heated fluid from the gearbox assembly, the rotor, and the stator, and a fourth conduit configured to supply the heated fluid from the sump to the pump; and a second valve disposed on the fluid circuit and configured to selectively move between a closed position where the fluid is not supplied to the rotor, and an open position where the fluid is supplied to the rotor for cooling thereof, wherein the controller is further programmed to operate the pump at a third flow rate to minimize power consumption when the second valve is closed and rotor cooling is not required, and operate the pump at a fourth flow rate higher than the third flow rate to facilitate providing cooling to the rotor when the second valve is open and rotor cooling is required.

In addition to the foregoing, the described EDM may include one or more of the following features: a sensor in signal communication with the controller, the sensor configured to measure at least one of a temperature of the stator and a load on the electric motor, wherein the controller is configured to automatically adjust at least one of the pump flow rate and the open or closed state of the valve based on measurements from the sensor.

According to another example aspect of the invention, a method of operating a thermal management system for a vehicle electric drive module (EDM) that includes a gearbox assembly and an electric motor having a rotor and a stator is provided. In one example implementation, the thermal management system includes a fluid circuit configured to supply fluid to the gearbox assembly, the rotor, and the stator, a pump, and a valve disposed on the fluid circuit. The method includes determining if a heat generation condition of the stator has reached or exceeded a predetermined threshold indicating that the stator should be cooled, operating the pump at a first flow rate when the heat generation condition of the stator is below the predetermined threshold to thereby minimize power consumption, and maintaining the valve in a closed position when the heat generation condition of the stator is below the predetermined threshold. The method further includes operating the pump at a second flow rate higher than the first flow rate when the heat generation condition of the stator is greater than the predetermined threshold, and opening the valve when the condition of the stator is greater than the predetermined threshold to thereby supply fluid to the stator for cooling thereof.

In addition to the foregoing, the described method may include one or more of the following features: wherein the heat generation condition of the stator is a temperature of the stator; wherein the heat generation condition of the stator is a load on the electric motor; and wherein the thermal management system further includes a second valve disposed on the fluid circuit and configured to selectively move between a closed position where the fluid is not supplied to the rotor, and an open position where the fluid is supplied to the rotor for cooling thereof, with the further steps of (i) determining if a heat generation condition of the rotor is greater than a predetermined threshold indicating that the rotor should be cooled, (ii) operating the pump at a third flow rate when the heat generation condition of the rotor is below the predetermined threshold to minimize power consumption, (iii) maintaining the second valve in a closed position when the heat generation condition of the rotor is below the predetermined threshold, (iv) operating the pump at a fourth flow rate higher than the third flow rate when the heat generation condition of the rotor exceeds the predetermined threshold, and (v) opening the valve when the heat generation condition of the rotor exceeds the predetermined threshold to thereby supply fluid to the rotor for cooling thereof.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Described herein are systems and methods for thermal management of an electric drive module (EDM) for an electric vehicle such as, for example, a battery electric vehicle (BEV). As described herein in more detail, a thermal management system includes a pump to operate at low power consumption and cease coolant supply to an EDM component (e.g., stator) that does not require cooling. The pump is operated at high capacity to selectively supply coolant (e.g., oil) to various components of the EDM only when heat generation in that particular component exceeds a predetermined threshold. As a result, overall system power is conserved and consumption is reduced.

Figure 1:
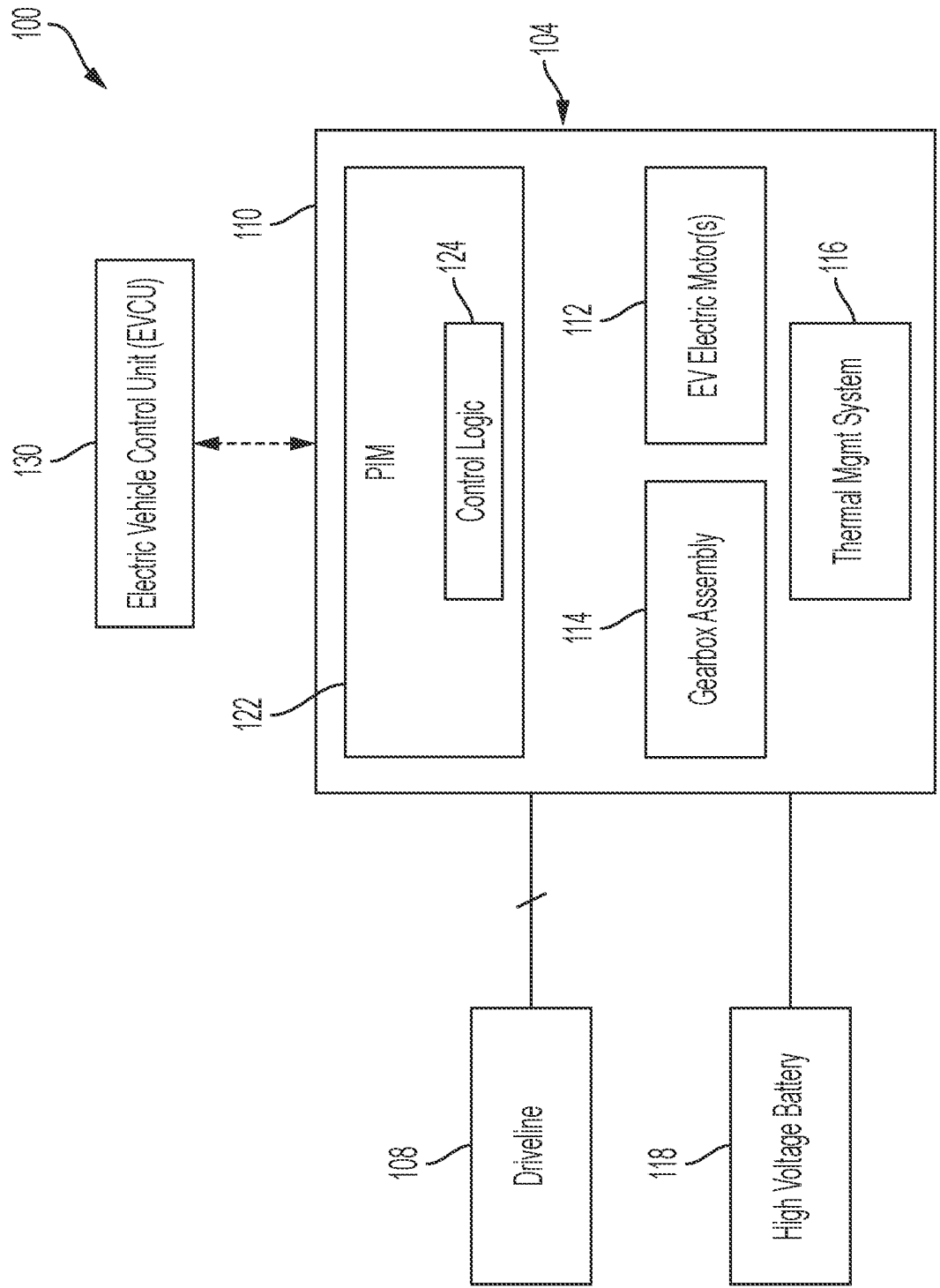
FIG. 1 is a functional block diagram of an example electric vehicle in accordance with the principles of the present application.

Referring now to FIG. 1, a schematic illustration of a BEV 100 (hereinafter, "vehicle 100") having an example thermal management system according to the principles of the present application is illustrated. The vehicle 100 generally comprises an electric drive module (EDM) 104 configured to generate and transfer drive torque to a driveline 108 for vehicle propulsion. In the example embodiment, the EDM 104 generally comprises a housing 110, one or more EV electric motors 112 (e.g., electric traction motors), a gearbox assembly 114, and a thermal management system 116. The electric motors 112 are selectively connectable to a high voltage battery system 118 for powering the electric motor(s) 112. The gearbox assembly 114 is configured to transfer the generated drive torque to the driveline 108, and the thermal management system 116 is configured to manage a temperature of the EDM components to prevent damage and improve operational efficiency. A power inverter module (PIM) 122 comprises its own control logic 124. An electrified vehicle control unit (EVCU) 130 generally controls the EDM 104 to generate a desired amount of drive torque to meet a driver demand (e.g., input via an accelerator pedal).

Figure 2:
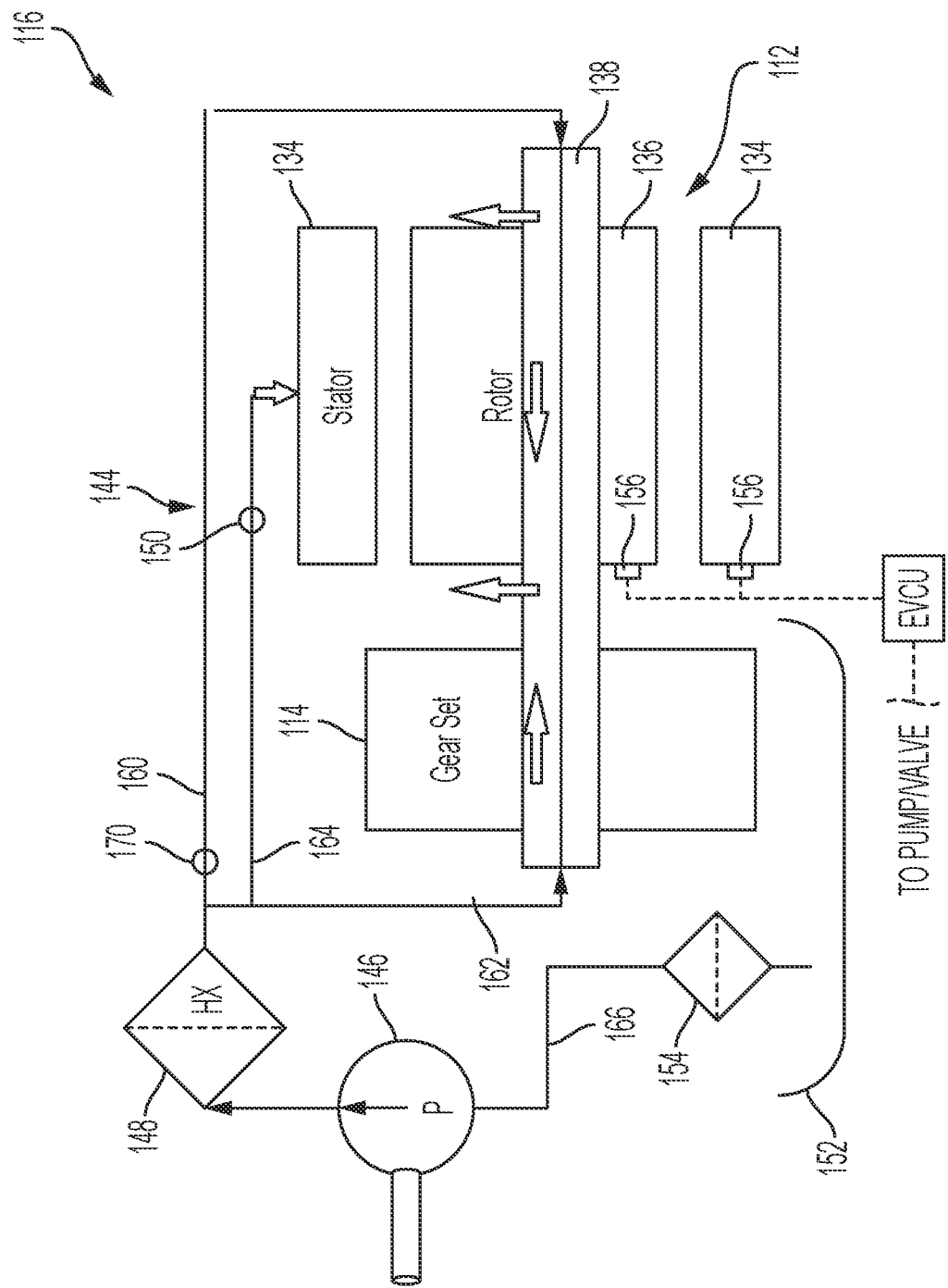
FIG. 2 is a schematic illustration of an example electric drive module for an electric vehicle (BEV) with a thermal management system in accordance with the principles of the present application.

In the example embodiment, each electric motor 112 generally includes a stator 134, a rotor 136, and a rotor shaft 138 (see FIG. 2). The stator 134 is fixed (e.g., to the housing 110) and the rotor 136 is configured to rotate relative to the stator 134 to drive the rotor shaft 138 and thus the vehicle axles/wheels (not shown). The EVCU 130 is typically powered by a low voltage battery (e.g., 12 volts, not shown), which could also be utilized to power one or more accessory loads (not shown) of the vehicle 100. The EVCU 130 communicates with the EDM 104 and other components via a CAN (e.g., the dashed communication lines connecting various systems). Specifically, in the example implementation, the EVCU 130 communicates with the EDM 104, including the gearbox assembly 114 and the thermal management system 116.

With additional reference to FIG. 2, the thermal management system 116 will be described in more detail. In the example embodiment, the thermal management system 116 is configured to provide a fluid (e.g., oil) for lubrication and/or cooling to various components of the EDM 104 and generally includes a fluid circuit 144 having a pump 146, a heat exchanger 148, a valve 150, a sump 152, and a filter 154. One or more sensors 156 are operably coupled to the stator 134 and/or the rotor 136 and in signal communication with the EVCU 130 or other vehicle controller.

In the example embodiment, the pump 146 is configured to supply the fluid through the fluid circuit 144 to EDM components including the gearbox assembly 114, the stator 134, and the rotor 136. In one example, pump 146 is an on-demand pump configured to provide a flow rate commanded by the EVCU 130 or other controller, for example, via a control algorithm. The heat exchanger 148 is configured to remove thermal energy from the fluid passing therethrough. For example, the heat exchanger 148 may be air cooled or directly or indirectly thermally coupled to another cooling system to dissipate heat thereto.

The valve 150 is configured to selectively supply the coolant to the stator 134, for example, when forced open by pressure (e.g., check valve) or commanded to open by EVCU 130 (e.g., solenoid valve). The sump 152 is configured to act as a reservoir to receive and collect the used/heated fluid after lubricating/cooling the EDM components. The filter 154 is configured to filter the oil from the sump 152 that is drawn into the pump 146. The one or more sensors 156 may include, for example, a temperature sensor to sense a temperature of the stator 134 and/or the rotor 136, and/or a load sensor configured to sense a current or load on the electric motor(s) 112.

In one example operation of the thermal management system 116, the pump 146 receives heated/filtered coolant from the sump 152 and supplies the coolant to heat exchanger 148 where it is subsequently cooled (e.g., via another coolant passing therethrough). A first portion of the coolant is then supplied via conduit 160 to the rotor shaft 138 for cooling of the rotor 136. A second portion of the coolant is supplied via conduit 162 to the rotor shaft 138 for lubrication of the gearbox assembly 114. A branch conduit 164 splits off from conduit 162 and is configured to supply coolant to the stator 134. However, valve 150 selectively prevents coolant from flowing to the stator 134.

In the example embodiment, valve 150 is configured to remain closed when stator heat generation is low (e.g., below a predetermined threshold, as measured by sensor(s) 156) and cooling of the stator 134 is not required. As such, the pump 146 is only required to supply coolant to the gearbox assembly 114 and the rotor 136. Therefore, the pump 146 can be operated at a reduced capacity, thereby reducing power consumption. When stator heat generation is high (e.g., above a predetermined threshold, as measured by sensor(s) 156), the increased amount of heat needs to be dissipated, for example, by spraying oil onto the stator 134 for cooling. As such, the valve 150 is opened to allow the flow of coolant to the stator 134.

In one example, valve 150 is a check valve that opens when the fluid pressure exceeds a predetermined threshold. Thus, when sensor(s) 156 sense a high stator heat generation condition, EVCU 130 increases pump flow rate, which raises the fluid pressure and opens valve 150 for flow to the stator 134. In another example, valve 150 is a solenoid valve in signal communication with the EVCU 130. When sensor(s) 156 indicate a high stator heat generation condition, EVCU 130 opens the solenoid valve for flow to the stator 134 and subsequent cooling thereof. It will be appreciated, however, that valve 150 may be any suitable valve that enables system 116 to function as described herein. The coolant heated by stator 134 subsequently flows to sump 152 where it is drawn through conduit 166 to be cleaned by filter 154 and returned to pump 146 to begin the cycle anew.

With continued reference to FIG. 2, thermal management system 116 may optionally include a second valve 170 disposed on conduit 160 for selectively supplying the first portion of coolant to the rotor 136 for cooling thereof. Similar to valve 150, the second valve 170 is configured to remain closed when rotor heat generation is low (e.g., below a predetermined threshold, as measured by sensor(s) 156) and cooling of the rotor 136 is not required. As such, the pump 146 is only required to supply fluid to the gearbox assembly 114, thus allowing the pump 146 to be potentially operated at an even further reduced capacity (e.g., lower flow rate), which further reduces power consumption. When rotor heat generation is high (e.g., above a predetermined threshold, as measured by sensor(s) 156), the increased amount of heat needs to be dissipated, for example, by supplying coolant through rotor shaft 138. As such, the valve 170 is opened to allow the flow of coolant to cool the rotor 136. Valve 170 may similarly be a check valve or solenoid valve configured to function as described above.

Figure 3:
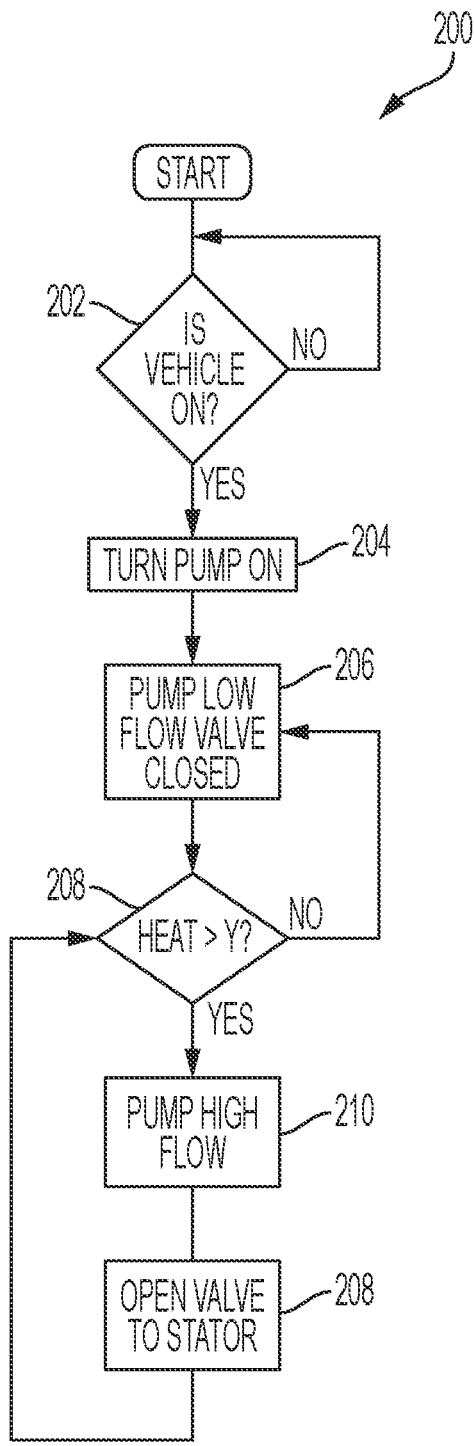
FIG. 3 is a flow diagram of an example method of operating the thermal management system of FIG. 2, according to the principles of the present application.

Referring now to FIG. 3, a flow diagram of an example method 200 of operating thermal management system 116 is illustrated. The method begins at step 202 where EVCU 130 determines if the vehicle 100 is on. If no, control returns to step 202. If yes, at step 204, EVCU 130 turns on pump 146 (if not already on) to supply lubricant to gearbox assembly 114 and rotor 136. At step 206, EVCU 130 operates pump 146 at a low flow rate or low power setting for only supplying fluid to the gearbox assembly 114 and the rotor 136 at a first predetermined flow rate (e.g., 3 Lpm or 50 W). At this setting, valve 150 is in the closed position (e.g., due to low fluid pressure or EVCU command) such that the cooling fluid is not supplied to the stator 134. This allows operation of pump 146 with a lower power consumption when, for example, cooling is not required at stator 134.

At step 208, EVCU 130 determines if a heat generation condition of the stator 134 has reached or exceeded a predetermined threshold (e.g., high temperature, high motor load) indicating that stator 134 should be cooled. If no, control returns to step 206. If yes, control proceeds to step 210 and EVCU 130 operates the pump 146 at a higher second fluid pressure or second power setting (e.g., 12 Lpm or 200 W) for supplying fluid to the stator 134. In the example embodiment, the second fluid pressure is higher than the first low fluid pressure and/or the second power setting is higher than the first low power setting. In some examples, this pump operation may be similar to the high flow rate or high capacity previously described. At step 212, the resulting higher pressure flow and/or EVCU command moves valve 150 to the open position such that lubricant/coolant is now supplied to the stator 134 for cooling in addition to both the gearbox assembly 114 and the rotor 136. Control may then return to step 208 and continue until the vehicle is turned off.

Figure 4:
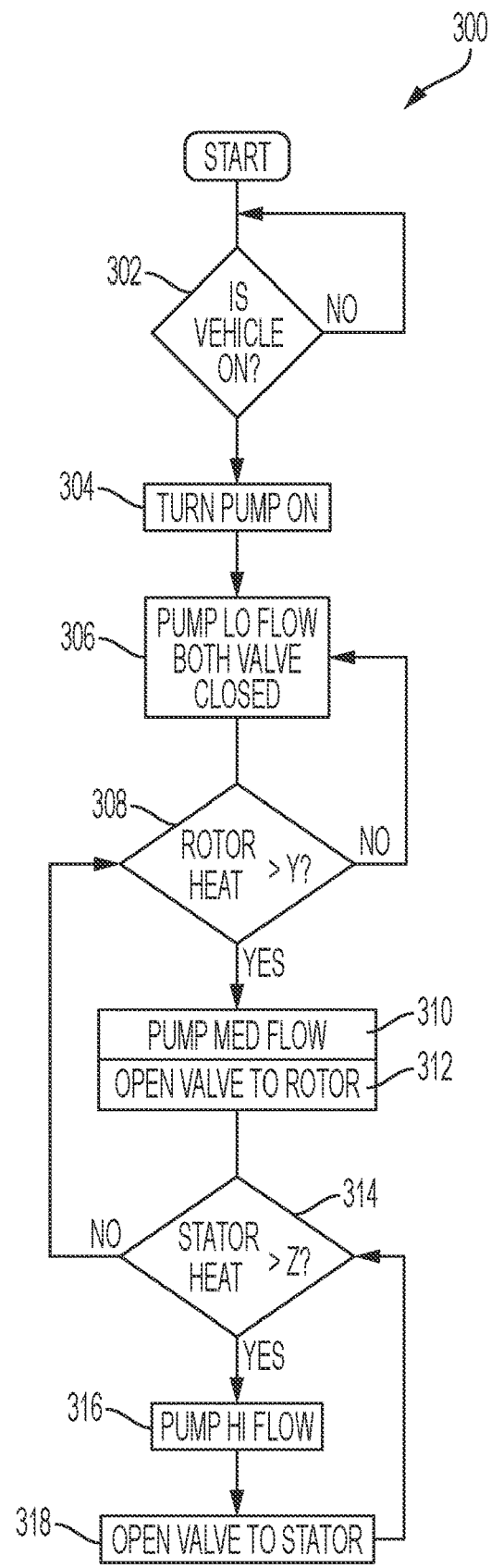
FIG. 4 is a flow diagram of another example method of operating the thermal management system of FIG. 2, according to the principles of the present application.

Referring now to FIG. 4, a flow diagram of an example method 300 of operating thermal management system 116 is illustrated. In this operation, thermal management system includes valve 170 to selectively allow supply of coolant to rotor 136. The method begins at step 302 where EVCU 130 determines if the vehicle 100 is on. If no, control returns to step 302. If yes, at step 304, EVCU 130 turns on pump 146 (if not already on) to supply lubricant to gearbox assembly 114. At step 306, EVCU 130 operates pump 146 at a first low flow rate or first low power setting for only supplying fluid to the gearbox assembly 114. In this way, valves 150, 170 are in the closed position (e.g., due to low fluid pressure or EVCU command) such that cooling fluid is not supplied to the stator 134 or rotor 136. This allows operation of pump 146 at a lower power consumption level when, for example, cooling is not required at stator 134 or rotor 136.

At step 308, EVCU 130 determines if a heat generation condition of the rotor 136 has reached or exceeded a predetermined threshold (e.g., high temperature, high motor load) indicating that rotor 136 should be cooled. If no, control returns to step 306. If yes, at step 310, EVCU 130 operates the pump 146 at a second fluid pressure or second power setting for supplying fluid only to the gearbox assembly 114 and the rotor 136. In the example embodiment, the second fluid pressure is greater than or equal to the first low fluid pressure and/or the second power setting is greater than or equal to the first low power setting. At step 312, valve 170 is moved to the open position (e.g., due to the higher fluid pressure or via EVCU command) such that lubricant/coolant fluid is now supplied to both the gearbox assembly 114 and the rotor 136.

At step 314, EVCU 130 determines if a heat generation condition of the stator 134 has reached or exceeded a predetermined threshold (e.g., high temperature, high motor load) indicating that stator 134 should be cooled. If no, control returns to step 308. If yes, control proceeds to step 316 and EVCU 130 operates the pump 146 at a third fluid pressure or third power setting for supplying fluid to the stator 134. In the example embodiment, the third fluid pressure is higher than the second fluid pressure and/or the third power setting is higher than the second power setting. In some examples, this pump operation may be similar to the high flow rate or high capacity previously described. At step 318, the resulting higher pressure flow and/or EVCU command moves valve 150 to the open position such that lubricant/coolant is now supplied to the stator 134 for cooling in addition to both the gearbox assembly 114 and the rotor 136. Control may then return to step 314 and continue until the vehicle is turned off.

Described herein are systems and methods for managing temperature and power consumption in an electric drive module in an electric vehicle. This is accomplished with a thermal management system includes a fluid circuit with an on-demand pump and one or more valves. A controller selectively varies pump flow rate and valve opening to optimize oil/coolant flow to different components of the electric drive module (the stator, rotor) based at least in part on real-time heat generation and cooling requirements of those components, to thereby avoid motor thermal damage while minimizing oil pump power consumption.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electric drive module (EDM) configured to generate and transfer drive torque to a driveline for propulsion of an electric vehicle, the EDM comprising:
    a gearbox assembly;
    an electric motor having a rotor, a rotor shaft, and a stator; and
    a thermal management system including:
        a fluid circuit configured to supply a fluid to the gearbox assembly via the rotor shaft, the rotor via the rotor shaft, and the stator;
        a pump configured to direct the fluid through the fluid circuit; and
        a valve disposed in the fluid circuit and configured to selectively move between (i) a closed position where the fluid is not supplied to the stator, and (ii) an open position where the fluid is supplied to the stator for cooling thereof.

2. The EDM of claim 1, further comprising a controller configured to:
    operate the pump at a first flow rate to minimize power consumption when the valve is closed and stator cooling is not required; and
    operate the pump at a second flow rate higher than the first flow rate to facilitate providing cooling to the stator when the valve is open and stator cooling is required.

3. The EDM of claim 2, wherein the controller is programmed to operate the pump at the second flow rate when a temperature of the stator exceeds a predetermined threshold.

4. The EDM of claim 2, wherein the controller is programmed to operate the pump at the second flow rate when a load on the electric motor exceeds a predetermined threshold.

5. The EDM of claim 2, wherein the controller is programmed to open the valve when a temperature of the stator exceeds a predetermined threshold.

6. The EDM of claim 2, wherein the controller is programmed to open the valve when a load on the electric motor exceeds a predetermined threshold.

7. The EDM of claim 2, wherein the valve is a check valve configured to remain closed when the pump is operated at the first flow rate, and open when the pump is operated at the second flow rate.

8. The EDM of claim 2, wherein the valve is a solenoid valve in signal communication with the controller, wherein the controller is configured to open the valve when the pump is operated at the second flow rate.

9. The EDM of claim 2, further comprising a second valve disposed on the fluid circuit and configured to selectively move between a closed position where the fluid is not supplied to the rotor, and an open position where the fluid is supplied to the rotor for cooling thereof,
    wherein the controller is further programmed to:
        operate the pump at a third flow rate to minimize power consumption when the second valve is closed and rotor cooling is not required; and
        operate the pump at a fourth flow rate higher than the third flow rate to facilitate providing cooling to the rotor when the second valve is open and rotor cooling is required.

10. The EDM of claim 2, further comprising a sensor in signal communication with the controller, the sensor configured to measure at least one of a temperature of the stator and a load on the electric motor,
    wherein the controller is configured to automatically adjust at least one of the pump flow rate and the open or closed state of the valve based on measurements from the sensor.

11. The EDM of claim 1, wherein the fluid circuit comprises:
    a first conduit configured to supply fluid to the gearbox assembly via the rotor shaft for lubrication of the gearbox assembly;
    a second conduit configured to supply fluid to the rotor via the rotor shaft for cooling of the rotor; and
    a third conduit configured to supply fluid to the stator for cooling thereof, wherein the valve is disposed on the third conduit.

12. The EDM of claim 11, wherein the fluid circuit further comprises:
    a sump configured to receive heated fluid from the gearbox assembly, the rotor, and the stator; and
    a fourth conduit configured to supply the heated fluid from the sump to the pump.

13. The EDM of claim 1, further comprising a heat exchanger disposed on the fluid circuit downstream of the pump and upstream of the valve.

14. A method of operating a thermal management system for a vehicle electric drive module (EDM) that includes a gearbox assembly and an electric motor having a rotor and a stator, the thermal management system having a fluid circuit configured to supply fluid to the gearbox assembly, the rotor, and the stator, a pump, and a valve disposed on the fluid circuit, the method comprising:
    determining if a heat generation condition of the stator has reached or exceeded a predetermined threshold indicating that the stator should be cooled;
    operating the pump at a first flow rate when the heat generation condition of the stator is below the predetermined threshold to thereby minimize power consumption;

maintaining the valve in a closed position when the heat generation condition of the stator is below the predetermined threshold;

operating the pump at a second flow rate higher than the first flow rate when the heat generation condition of the stator is greater than the predetermined threshold; and opening the valve when the condition of the stator is greater than the predetermined threshold to thereby supply fluid to the stator for cooling thereof.

15. The method of claim 14, wherein the heat generation condition of the stator is a temperature of the stator.

16. The method of claim 14, wherein the heat generation condition of the stator is a load on the electric motor.

17. The method of claim 14, wherein the thermal management system further includes a second valve disposed on the fluid circuit and configured to selectively move between a closed position where the fluid is not supplied to the rotor, and an open position where the fluid is supplied to the rotor for cooling thereof, with the further steps of:

determining if a heat generation condition of the rotor is greater than a predetermined threshold indicating that the rotor should be cooled;

operating the pump at a third flow rate when the heat generation condition of the rotor is below the predetermined threshold to minimize power consumption;

maintaining the second valve in a closed position when the heat generation condition of the rotor is below the predetermined threshold;

operating the pump at a fourth flow rate higher than the third flow rate when the heat generation condition of the rotor exceeds the predetermined threshold; and opening the valve when the heat generation condition of the rotor exceeds the predetermined threshold to thereby supply fluid to the rotor for cooling thereof.

18. The method of claim 14, wherein the fluid circuit supplies fluid to the gearbox assembly via a rotor shaft, and wherein the fluid circuit supplies fluid to the rotor via the rotor shaft.

* * * * *